June 28, 1955     G. F. KINGMAN     2,711,984
DEBONDING METHOD
Filed March 20, 1952
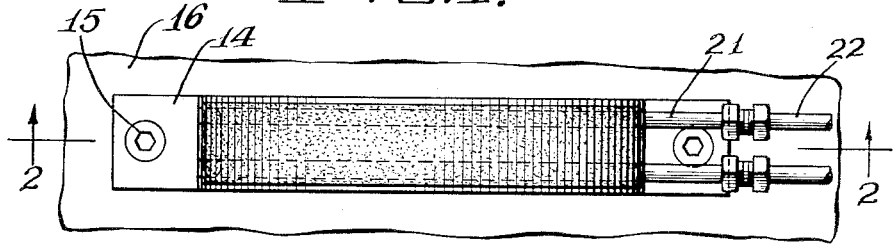
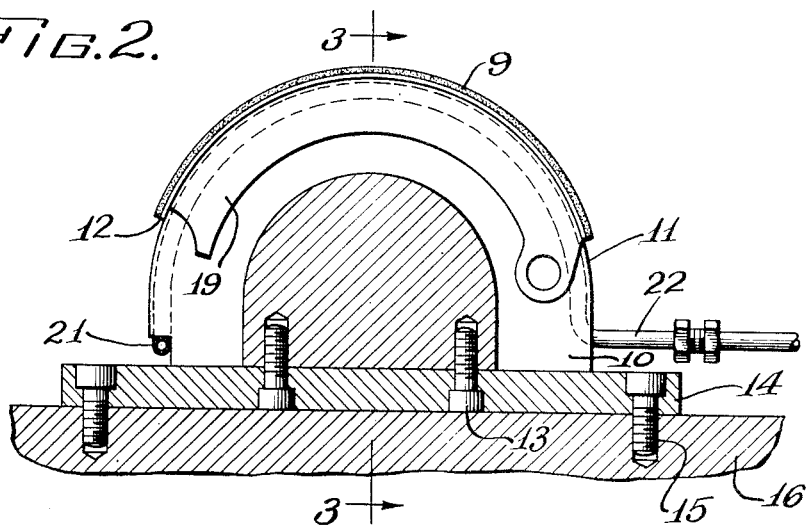
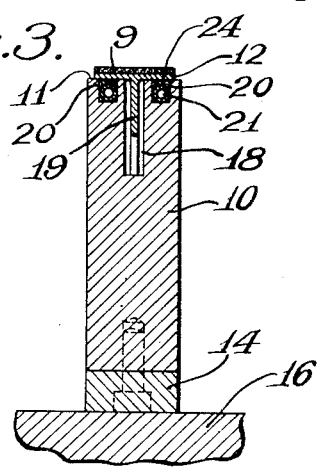
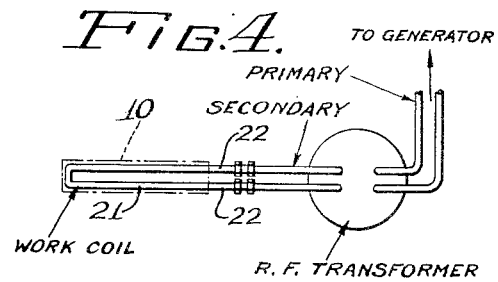
Inventor:
George F. Kingman
By Gary, Desmond & Parker
Attys.

United States Patent Office 2,711,984
Patented June 28, 1955

2,711,984

DEBONDING METHOD

George F. Kingman, Bridgeport, Conn., assignor to Raybestos-Manhattan, Inc., Passaic, N. J., a corporation of New Jersey Application March 20, 1952, Serial No. 277,693

1 Claim. (Cl. 154—128)

This invention relates to a novel device and method for debonding adhesively united brake linings from brake shoes by breaking down heat hardened or cured organic adhesive binder between a brake shoe and a bonded lining so as to permit them to be separated when desired, such as for replacement of the lining.

The device of the present invention is characterized by the employment of radio frequency induction heating, such as on the order of 400 kilocycles, which enables the desired operation to be quickly and effectively carried out and the heat localized to the component to be heated, that is the rim of the brake shoe, which conducts the heat to the layer of hardened adhesive interposed between the rim and the brake lining.

Thus for example in the debonding of a brake shoe lining of conventional asbestos-containing friction material composition, such as is employed for automotive devices, from a ferrous metal brake shoe to which it has been bonded by means of a binder such as for example a thermosetting phenolic resin, the brake shoe can be rapidly brought, by means of the device of the present invention, to a temperature of about 1200–1400° F. in about 12 seconds, so as to cause destructive distillation and charring of the organic binder, after which the lining may be readily lifted from the shoe, with, if desired, the aid of a simple instrument such as a spatula.

Other objects and advantages, together with arrangement of parts and details of construction and operation, will be apparent from a consideration of the following specification and drawings, wherein:

Fig. 1 is a plan view of the device of the present invention, with a lined brake shoe mounted thereon.

Fig. 2 is a vertical, sectional view on the line 2—2 of Fig. 1.

Fig. 3 is a transverse sectional view on the line 3—3 of Fig. 2.

Fig. 4 is a wiring diagram.

Referring to the drawings, the device comprises the support component 10 having an outer convex or arcuate face 11 adapted to seat the rim or flanges of a brake shoe 12. The arcuate surface of the support 10 conforms to the arc of the brake shoe being handled, and when a brake shoe of different arc is to be handled, a support of suitable arc may be engaged in position by means of the bolts 13 connecting the support 10 to the plate 14, and the bolts 15 connecting the plate 14 to the bed 16.

The convex face of the member 10 is formed with a medial groove or slot 18 sufficiently deep and wide for freely receiving the rib 19 of the brake shoe 12. The member 10 is further formed with a pair of spaced, upwardly opening slots or grooves 20, one on each side of the slot 18, which receive and seat and hold spaced the parallel arcuate components of the tubular copper induction heating element or work coil 21, the components being connected by a U bend adjacent one end of arcuate face or support 10, and being connected at their other ends 22 to a suitable source of energy, diagrammatically shown in Fig. 4.

The supporting element 10 is formed of a suitable nonconducting insulating material, for example an asbestos fiber-resin composition. In the alternative, although not shown, the unit 10 may be composed of four boards of like composition, suitably connected and held spaced to provide the medial slot or groove 18 and the two outer slots or grooves 20. The outer ends of the grooves 20 seating the element 21 are closed by means of a suitable insulating cement as at 24 covering and protecting the work coil, or, in the alternative, the coil may wrapped by insulating means such as asbestos glass fabric.

In operation, a brake shoe is placed on the support 10 and seated thereon by inserting its rib 19 in the slot 18, and the brake shoe is inductively heated by means of eddy currents from the heating elements 21, until it glows, at which time, approximately 12 seconds, the organic bonding cement chars and the lining 9 can be readily removed. The shoe in this period becomes heated to a temperature of about 1200 to 1400° F., and the operation can be regulated by a suitable timer. This rapid raising of the temperature quickly results in destructive distillation of the binder. The gases and other volatiles quickly generated, form blisters at and within the cement line during the brief period when the binder is decomposing and reverting to a plastic nature to actually lift the lining from the shoe and thereby effect a relatively clean separation, leaving the shoe with a relatively clean, smooth surface, so that the shoe will require little, if any, grinding to prepare it for a new lining.

I claim as my invention:

The method of debonding a friction material composition lining from a ferrous metal automotive arcuate brake shoe to which it has been adhesively united by means of an interposed layer of heat-hardened organic binder, by rapid destructive distillation of said binder, which comprises disposing the exposed metallic underface of said brake shoe in close proximity and parallel to a coil element, and passing a current of radio frequency on the order of 400 kilocycles through said coil to inductively generate eddy currents in said brake shoe and to heat it to a temperature of from about 1200° F. to about 1400° F. to thereby rapidly heat said layer of adhesive by conduction of heat from the resulting heated shoe while permitting said lining to remain unconfined, whereby gases and other volatiles generated form blisters at the cement line during said heating to lift and separate the lining from the shoe.

References Cited in the file of this patent

UNITED STATES PATENTS

| 1,385,079 | Jones | July 19, 1921 |
|---|---|---|
| 2,291,862 | Bailey | Aug. 4, 1942 |
| 2,416,427 | Bonawit et al. | Feb. 25, 1947 |
| 2,430,285 | Ferris | Nov. 4, 1947 |
| 2,520,978 | Super | Sept. 5, 1950 |
| 2,609,310 | Barrett | Sept. 2, 1952 |
| 2,642,919 | Kingman | June 23, 1953 |

FOREIGN PATENTS

| 837,961 | France | Feb. 23, 1939 |